R. H. RICE.
VEHICLE WHEEL.
APPLICATION FILED FEB. 9, 1907.
925,027.
Patented June 15, 1909.
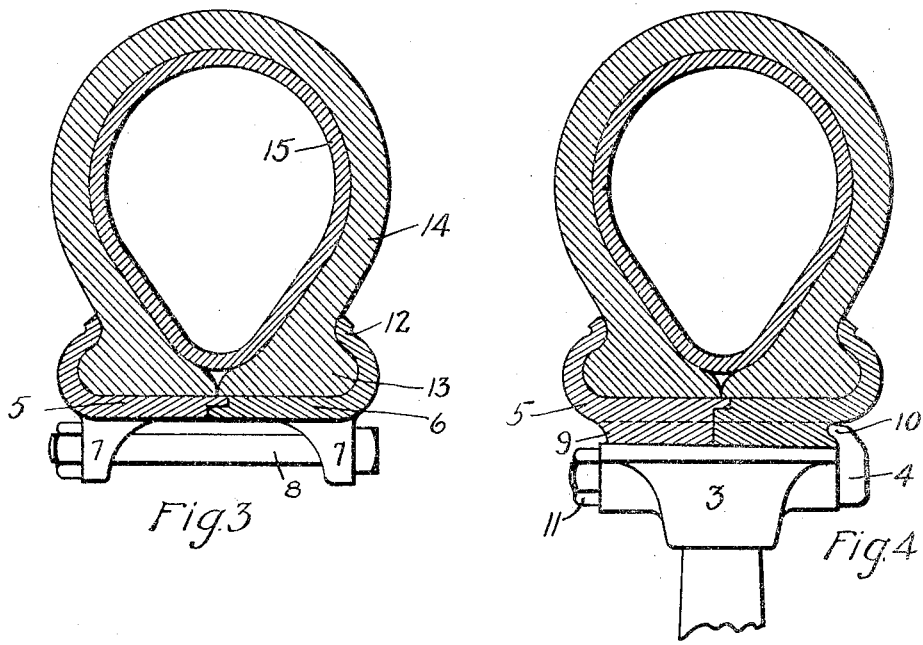
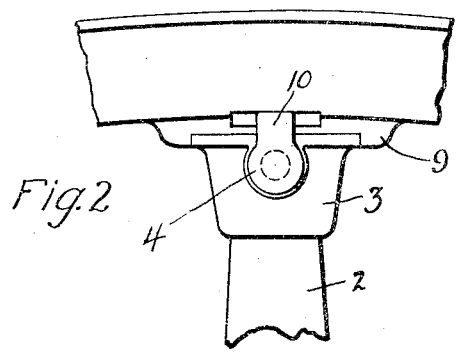
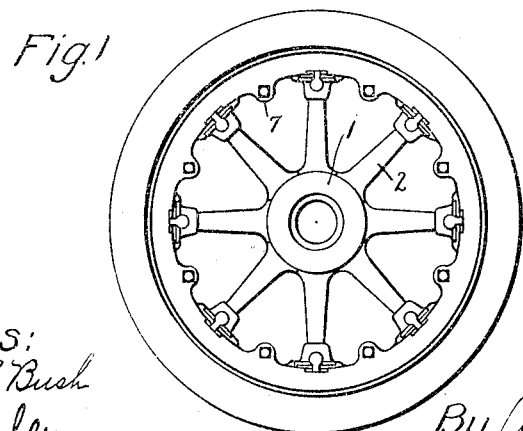
Witnesses:
Lloyd C. Bush
J. Ellis Glen.
Inventor:
Richard H. Rice,
By Albert G. Davis
Atty

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

VEHICLE-WHEEL.

No. 925,027.      Specification of Letters Patent.      Patented June 15, 1909.

Application filed February 9, 1907. Serial No. 356,558.

*To all whom it may concern:*

Be it known that I, RICHARD H. RICE, a citizen of the United States, residing at Lynn, county of Essex, State of Massachusetts, have invented certain new and useful Improvements in Vehicle-Wheels, of which the following is a specification.

The present invention relates to automobile wheels having detachable rims, which rims are constructed and arranged in such manner that they are capable of supporting a pneumatic tire in an inflated condition when removed from the wheel, so that in case of accident the rim and tire can be removed as a unit from the wheel and another rim with its inflated tire substituted.

My invention has for its object to improve the construction of automobile wheels of the type referred to.

For a consideration of what I believe to be novel and my invention, attention is called to the accompanying description and claims appended thereto.

In the accompanying drawing, which illustrates one of the embodiments of my invention, Figure 1 is a view in elevation of an automobile wheel; Fig. 2 is an enlarged detail view showing the means for securing the rim to the spokes; Fig. 3 is an enlarged cross-sectional view showing the tire in an inflated condition with the means for uniting the parts of the rim; and Fig. 4 is a similar view arranged to show the means for securing the rim to the heads on the spokes.

In carrying out my invention, a hub 1 of suitable construction is provided having as many radial spokes 2 as are necessary. On the end of each spoke is a metal head 3 rectangular in shape and containing an opening to receive the rim-retaining bolts 4. The heads are firmly secured to the spokes and the peripheries of the several heads are beveled slightly in an axial direction so that the rim will be firmly seated in place when the nuts on the clamping bolts 4 are screwed into place. The rim is made of suitable metal and is formed in two parts with a shouldered joint between the parts. The parts of the rim are each provided with inwardly extending lugs 7, through which the rim clamping bolts 8 pass. I may use as many of these bolts as are necessary. As shown, a bolt is provided between each two spokes. The rim opposite each spoke is provided with a boss 9 having a surface of limited area machined to correspond with the beveled peripheral surface of said head. It is to be noted that the surface of each head is flat and rectangular. This is a superior construction for the reason that the parts may be readily machined. It is evident that a beveled surface on the rim cannot be turned in a lathe or boring mill unless the bosses 9 are made separate, but by making the said surfaces flat the rim can be mounted in a shaper or equivalent machine and finished by moving the tool perpendicularly to the plane of the rim. Each boss is provided with shoulders which engage the head 3 on opposite sides so that the driving strains are transmitted directly to the rim, thereby relieving the bolts 4. The rim retaining bolts 4 are provided with heads having extensions or projections 10 that engage with the bosses 9 on the inner surface of the rim, so that when the nuts 11 are screwed into place on the bolts, the rim as a whole will be moved to the left up the incline until it is firmly seated on the heads 3.

The parts of the rim are provided with curved flanges 12 of usual construction to engage the enlarged portion 13 of the outer shoe 14. Located inside of the shoe is an inner tube 15 of any suitable construction provided with the usual stem and valve for inflating. Owing to the open work construction of the wheel, the stem can be situated between one of the spokes and a rim clamping bolt 8. Between the spokes and heads ample space is afforded for the clamps to prevent the shoe from creeping on the rim. As shown, eight rim retaining bolts 4 are provided, one for each spoke, but it is obvious that the number can be changed if desired.

To remove the tire and rim from the wheel, the nuts 11 on the bolts 4 are taken off and the bolts driven out, after which the rim and tire can be readily removed by forcing them as a unit to the right, Fig. 4. Since the peripheral faces of the heads are on a bevel, this is a simple matter. It will be observed that in removing the rim and tire it is unnecessary to disturb the rim clamping bolts 8.

By making the rim in two parts with the joint in the plane of the wheel, the outer shoe can be readily mounted in place or removed from the rim by taking out the rim bolts 8. This results in a material saving of time, prevents injury to the shoe or to the inner tube and also enables relatively unskilled persons to make the change.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a wheel, the combination of a hub member, spokes radiating therefrom, the peripheral surfaces of which are beveled in one direction, a flanged tire-holding rim divided in the plane of the wheel, whose parts directly engage with and are supported by said surfaces, a tire in the rim, a set of devices which serve only to unite the parts of the rim and hold the tire so that the tire and rim can be removed and applied as a unit, a set of axial bolts which wedge the rim on the peripheral surfaces of the spokes from one side only, and means which relieve the set of bolts from strains in the plane of the wheel.

2. In a wheel, the combination of a hub member, spokes radiating therefrom, the peripheral surfaces of which are flat and beveled axially, a divided tire-holding rim which has as many points of support as there are spokes, each point of support being axially beveled to fit the end of the corresponding spoke, inwardly extending lugs on the rim located between the spokes, means extending through the lugs and located between the rim and axis, which unite the parts of the rim, and other means in line with the spokes for pulling the rim up the beveled surfaces of the spoke ends and clamping the same in place.

3. In a wheel, the combination of a hub member having a plurality of radial spokes, an individual metal head on each of the spokes, the said heads having beveled peripheral surfaces, a detachable rim mounted on the heads which is split in the plane of the wheel, both parts thereof being supported by said heads, a tire carried by the rim, a set of bolts for uniting the parts of the rim and holding the tire in place when removing the rim from the wheel, a second set of bolts for drawing the rim to its seat on the beveled surfaces of the heads, and a means on the rim engaging said heads for transmitting torque from the spokes to the rim for preventing independent angular movements of the rim and heads and relieving the second set of bolts of torsional strains.

4. In a wheel, the combination of a hub, spokes secured therein, heads for the spokes, the ends of which are flat and beveled in one direction only to form seats, a detachable rim mounted on the seats and split in the plane of the wheel, the inner surface of said rim being beveled for a limited area opposite each head and in one direction only to fit said seats, shoulders formed on the inner surface of the rim which engage the heads on both sides to transmit power, bolts that pass through the heads and engage the rim to hold the rim and heads against relative axial movement, flanges on the rim, a pneumatic tire held by the flanges, and means independent of said bolts and located between the said heads for uniting the parts of the rim.

In witness whereof, I have hereunto set my hand this fifth day of February, 1907.

RICHARD H. RICE.

Witnesses:
JOHN A. McMANUS, Jr.,
HENRY O. WESTENDARP.